United States Patent
Igarashi

(10) Patent No.: US 6,922,527 B2
(45) Date of Patent: Jul. 26, 2005

(54) IMAGE DISPLAY APPARATUS AND PRINT SYSTEM

(75) Inventor: Hiroshi Igarashi, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/725,054

(22) Filed: Dec. 2, 2003

(65) Prior Publication Data

US 2004/0109150 A1 Jun. 10, 2004

(30) Foreign Application Priority Data

Dec. 2, 2002 (JP) ........................................ 2002-349803

(51) Int. Cl.$^7$ .......................... G03B 27/00; H04N 1/387
(52) U.S. Cl. .................. 396/147; 348/346; 348/333.02; 358/453
(58) Field of Search ................................ 396/147, 429; 382/100, 282, 255; 358/527, 538, 453; 348/346, 333.02, 333.04, 333.05; 355/40

(56) References Cited

U.S. PATENT DOCUMENTS

| | | | | |
|---|---|---|---|---|
| 5,023,657 A | | 6/1991 | Kuriyama | |
| 5,103,254 A | * | 4/1992 | Bell et al. | 396/147 |
| 5,847,836 A | * | 12/1998 | Suzuki | 358/296 |
| 6,734,909 B1 | * | 5/2004 | Terane et al. | 348/333.05 |
| 2003/0002870 A1 | * | 1/2003 | Baron | 396/147 |

FOREIGN PATENT DOCUMENTS

| | | |
|---|---|---|
| JP | 64-26830 A | 1/1989 |
| JP | 2001-128044 A | 5/2001 |

* cited by examiner

*Primary Examiner*—W. B. Perkey
(74) *Attorney, Agent, or Firm*—Sughrue Mion, PLLC

(57) ABSTRACT

The image display apparatus reads image data, which is recorded by a digital camera etc., from a recording medium etc.; sets an in-focus frequency spectrum threshold for in-focus determination according to the resolution (pixel count) and compressibility of the inputted image data; analyzes a frequency spectrum of the image data; and determines whether a location where frequency components whose levels are higher than the threshold exist in an image. The location having the most frequency components whose levels are higher than the threshold is determined as an in-focus location. If an in-focus location exists, a mark showing the in-focus location is displayed on a screen of a display device. If no in-focus location exists in the image, the image display apparatus performs display of warning information and/or a warning by sound, and prompts the user to confirm necessity of printing.

18 Claims, 10 Drawing Sheets

INDEX DISPLAY SCREEN: NORMAL

INDEX DISPLAY SCREEN: IN-FOCUS LOCATION DISPLAY

INDEX DISPLAY SCREEN: IN-FOCUS LOCATION DISPLAY

INDEX DISPLAY SCREEN: ENLARGED IN-FOCUS LOCATION DISPLAY

IMAGE DISPLAY APPARATUS AND PRINT SYSTEM

BACKGROUND OF THE INVENTION

1. Field of the Invention

The present invention relates to an image display apparatus which can reproduce and display image data recorded with a digital camera etc., and to a print system including the image display apparatus.

2. Description of the Related Art

In conventional print apparatuses, when image data recorded through digital cameras have been selected and printed, it might arise to print out also data of blurred images, and hence, useless prints have been frequently produced.

In order to eliminate such a useless print, it has been required to enlarge an image to be printed so as to confirm the image about whether focusing has been fine, to verify whether the object has been focused, and to select printing. However, this operation becomes complicated. Moreover, when there are a plenty of recorded images, a plenty of time is required only by selecting images to be printed. Therefore, printing only images focused on objects has given a workload to the user.

Japanese Patent Application Publication No. 64-26830 corresponding to U.S. Pat. No. 5,023,657 discloses an apparatus performing out-of-focus display, which determines by using optical focus control device whether in-focus is possible in a microfilm, and performs out-of-focus display.

Japanese Patent Application Publication No. 2001-128044 discloses recording in-focus data of recorded images with image data as positional information and displaying an in-focus location on the basis of the focused position information when an image is displayed so as to easily print only the focused images. However, when an object moves or an angle of view is changed from a state that the user decided composition with half pressing a shutter-release button to a state that the user takes an image with fully pressing the shutter-release button thereafter, it is difficult to match the focused position information with the recorded image data.

SUMMARY OF THE INVENTION

The present invention is achieved in consideration of such circumstances, and aims to provide an image display apparatus that can present an in-focus location by automatically determining the in-focus location of an inputted image, and can prevent a useless print output by eliminating an unfocused image (so-called blurred image) by utilizing the image display apparatus.

In order to attain the above-described object, the present invention is directed to an image display apparatus, comprising: a signal processing device which generates a display signal from inputted image data; a display device which displays an image according to the display signal generated by the signal processing device; an in-focus location determination device which performs analysis of the inputted image data and identifies an in-focus location in the image represented by the inputted image data according to a result of the analysis; and a display control device which makes the display device display information specifying the in-focus location identified by the in-focus location determination device.

According to the present invention, when image data recorded by an electronic image-recording apparatus such as a digital camera is inputted to the image display apparatus, the image data are converted into the display signal by the signal processing device and reproduced and displayed on the display device. The in-focus location is automatically determined by analyzing the inputted image data itself, and the in-focus location is specified for the user through a screen of the display device. Hence, it is possible to achieve the shortening of the time needed to select images to be printed since it is possible to easily determine the necessity of printing, for example, when an image to be printed is selected.

Preferably, the in-focus location determination device comprises: an analysis device which divides one screen of the image represented by the inputted image data into a plurality of areas, and calculates a frequency spectrum of the inputted image data for each of the plurality of areas; and a threshold calculation device which calculates a threshold for in-focus determination according to recording condition including at least one of resolution and compressibility of the inputted image data, wherein the in-focus location determination device compares the frequency spectrum calculated by the analysis device with the threshold calculated by the threshold calculation device, and determines one of the plurality of areas that has most frequency components whose levels are higher than the threshold, as the in-focus location.

As a determination method of an in-focus location, there is an aspect of determining a location having a plenty of frequency components whose levels are higher than a threshold, as the in-focus location by performing frequency analysis of image data. When there is not any area where a frequency component whose level is higher than the threshold is included, it is determined that no in-focus location exists. Thus, it is possible to determine the presence of an in-focus location and to identify the in-focus location.

Preferably, the image display apparatus further comprises a warning device which gives a warning when the in-focus location determination device determines that there is no in-focus location in the image. The warning device may be a device appealing to user's eye such as a device performing warning display by using the display device, may be also a sound output device appealing to user's hearing such as a warning sound and warning message voice, or may be also an aspect of using these together. According to the present invention, it is possible to prompt the user to perform confirmation by giving a warning in display or a sound when there is no in-focus location in the image, for example, it is possible to prevent a print output of a useless image.

Preferably, the image display apparatus further comprises an enlarged-display control device which makes the display device enlargedly display an image in the in-focus location identified by the in-focus location determination device. According to the present invention, it is possible to easily confirm an in-focus condition by partially enlargedly displaying the in-focus location in the image. It is a preferable aspect to enlargedly display an image to be printed, in the size approximately equivalent to that of a real print when the image is selected.

The present invention is also directed to a print system, comprising: a data obtaining device which obtains image data; a signal processing device which generates a display signal from the image data obtained by the data obtaining device; a display device which displays an image according to the display signal generated by the signal processing device; an in-focus location determination device which performs analysis of the image data and identifies an in-focus location in the image represented by the image data according to a result of the analysis; a display control device which makes the display device display information specifying the in-focus location identified by the in-focus location determination device; a selection operation device with which operation is performed to select an image to be printed from among the image displayed on the display device; and a print device which prints the image selected with the selection operation device.

According to the present invention, it is possible to shorten the time needed to select images to be printed since it is possible to confirm an in-focus location in a print image at the time of selecting the print image. Moreover, it is possible to avoid a print output of a blurred image.

The data obtaining device may be a medium readout device reading data from a portable recording medium (removable medium) such as a memory card, or may be also a communication device (either a wired system or a wireless system) such as a USB device, an IEEE1394 device, or a Bluetooth device. Furthermore, there is also an aspect of obtaining data from a server or a terminal on a network by using a network communication device connected to a LAN or a WAN.

The present invention is also directed to a program which makes a computer achieve: a signal processing function of generating a display signal from inputted image data; an image display function of making a display device display an image according to the display signal generated by the signal processing device; an in-focus location determination function of performing analysis of the inputted image data, and identifying an in-focus location in the image represented by the inputted image data according to a result of the analysis; and an in-focus location display function of making the display device display information specifying the in-focus location identified by the in-focus location determination function.

The program according to the present invention may be constituted as single application software, or may be also built in as a part of application software such as browser software, file management software, or image processing and editing software. Moreover, the program according to the present invention is not limited to the case that the program is applied to a computer system such as a personal computer, but can be applied as an operation program of a central processing unit (CPU) built into an image processing apparatus such as a print machine, or an image reproducer that is installed in a shop etc.

Furthermore, it is possible to record the program according to the present invention in a recording medium such as CD-ROM or a magnetic disk and to provide the program to a third person through the recording medium. Alternatively, it is also possible to provide a download service of the program through a telecommunication line such as the Internet.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereafter, embodiments of the present invention will be explained in detail with referring to drawings.

Figure 1:
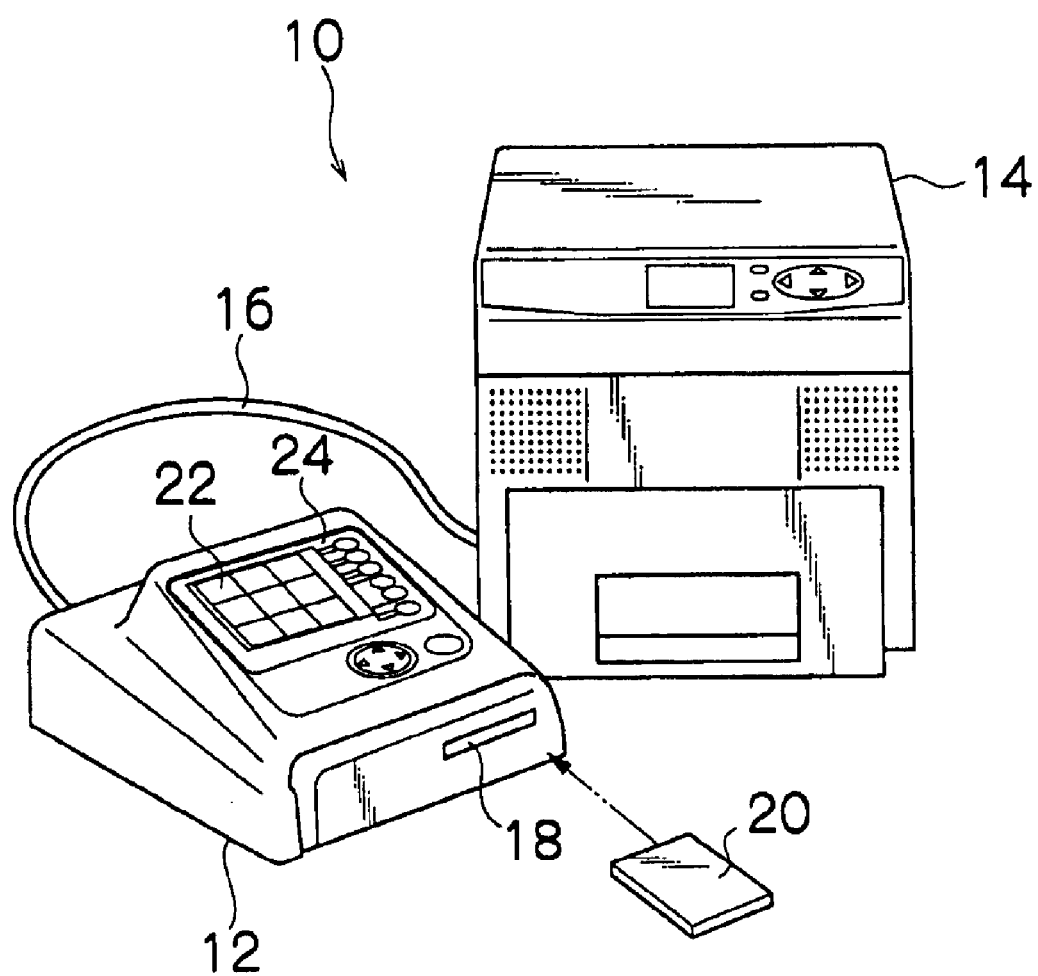
FIG. 1 is an outside view of a print system according to an embodiment of the present invention.

FIG. 1 is an outside view of a print system 10 according to an embodiment of the present invention. This print system 10 comprises a controller 12 and a printer 14, which are communicably connected with a connecting cable (for example, a SCSI cable) 16.

The controller 12 functions as an image input device for obtaining image data, and also as a controller for controlling the operation of the printer 14, and performs various types of settings, selection, display, execution instructions, and the like, which are necessary for print processing, on the basis of user's operation. A media loading slot 18 is formed in a front side face (front face) of the controller 12, and a recording medium 20 can be inserted in the media loading slot 18 to input image data stored therein to the print system 10.

Types of the recording medium 20 are not limited in particular, and it is possible to apply semiconductor memory cards such as a SmartMedia (trademark) card, a Compact-Flash (trademark) card, a PC card, and an xD Picture Card (trademark), and various types of media such as a magnetic disk, an optical disk, and a magneto-optical disk. Although a single media loading slot 18 is shown in FIG. 1, it is also a possible aspect to provide a plurality of media loading slots so as to be able to handle a plurality of same or different types of recording media.

On a top face of the controller 12, a display section 22 for displaying image content, operation guide, etc., and a control section 24 for the user to perform various types of inputs are provided. Image files recorded in the recording medium 20 are read when the recording medium 20 is inserted into the media loading slot 18, and their image contents are displayed on the display section 22. The user can perform the operation of designating the necessity of printing and printed sheet counts while confirming the images with the display section 22.

The controller 12 has a "full frame print mode" for printing all images recorded in the recording medium 20, and a "selection print mode" for arbitrarily designating images that the user wants to print while confirming image contents. The user can properly select each of these modes by predetermined operation. For example, there is an aspect of enabling the user to select a mode with displaying a mode selection screen on the display section 22 when the recording medium 20 is loaded into the media loading slot 18. The structure of the controller 12 will be further described later.

On the other hand, the printer 14 is a digital image printer that prints images according to a command from the controller 12. Print methods are not limited in particular, and it is possible to use various types of methods such as a thermo auto-chrome (TA) method that photographic paper itself pigments by heat, an inkjet method that sprays ink drops on paper by nozzles, a sublimation method, and a thermal transfer method. Paper sizes also are not limited in particular, and it is possible to use proper paper size such as L size (127×89 mm) for photograph, 2L size, hi-vision size (158×89 mm), card size (55×89 mm), postcard size, seal types (two-section/four-section/sixteen-section), B5, A4, and A3. A paper form is not limited to a cut sheet, and there is also an aspect that uses a rolled continuous paper form.

According to the TA method, the TA paper itself has coloring layers of Y (yellow), M (magenta), and C (cyan), and each color is developed by applying different thermal energy to each by heating the paper with a thermal head installed in a printer, and the developed colors are stabilized by ultraviolet exposure. Hence, the TA method has advantages such as no work load of an ink change etc., simple maintenance, and no generation of special wastes such as ink ribbons or ink cartridges that were used.

Figure 2:
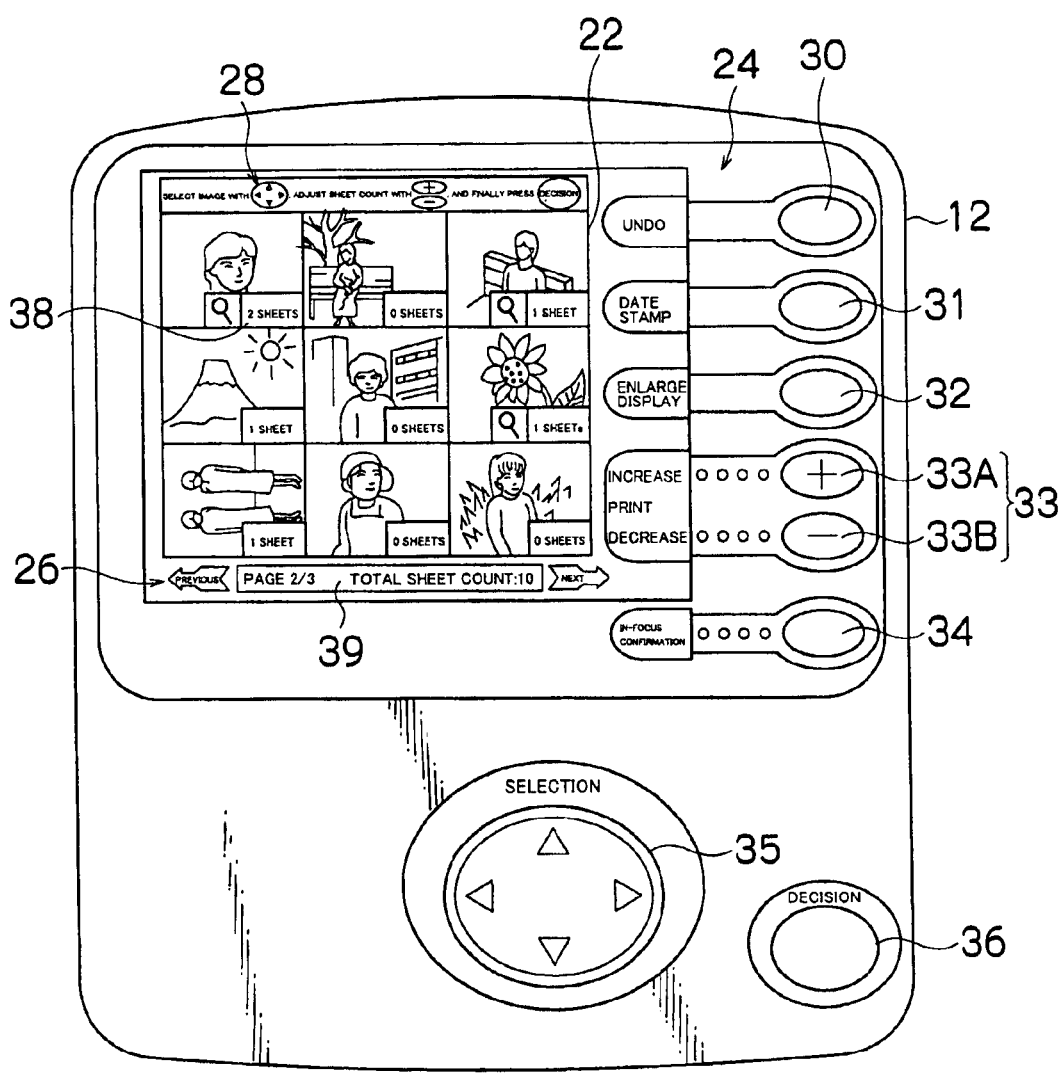
FIG. 2 is an enlarged drawing showing a top face of a controller shown in FIG. 1.

FIG. 2 is an enlarged drawing showing a substantial part of a top face of the controller 12. The display section 22 is constituted of a color liquid crystal display, and contents of inputted images are displayed in list display (index display) on the display section 22. As shown in the drawing, images are displayed in 3×3 nine-sectional multi-screen display on the display section 22. Display forms of images are not limited to this, and it is possible to adopt various display forms such as 2×2 four-sectional multi-screen display, 3×2 six-sectional multi-screen display, and 4×4 sixteen-sectional display. Hence, it is possible to properly perform setting in relation to the screen size of the display section 22. Of course, it is also possible to adopt a display form of enabling the display section 22 to display a single image (single screen display). Hence, the user can select an image with verifying the contents of the images while switching display methods of image selection screens if necessary.

In the index display, when all images in the recording medium 20 cannot be displayed on one screen, they are displayed with being divided in pages. In this case, the page number information (for example, "the current page number/the last page number") is displayed in an information display area 26 that is assigned in a lower part of the screen of the display section 22. In addition, operation guide is displayed in an information display area 28 in an upper part of the screen of the display section 22.

The control section 24 of the controller 12 includes an undo button 30, a dating button 31, an enlargement button 32, a printed sheet count adjusting button 33, an in-focus confirmation button 34, a selection button 35, and a decision button 36.

The selection button 35 is constituted of a four-way directional button that is inclinable in up, down, right, and left directions. This selection button 35 functions as a device for selecting an image from among images displayed on the display section 22, and also as an operation device (cursor moving-operation device) for selecting a desired item on an input screen for designating a type, size, etc. of a print.

The decision button 36 functions as a device for inputting a command that makes selection by the selection button 35 determined, and also as a device for inputting a command of executing the printing of a selected image. The undo button 30 is used at the time of canceling a selected item or returning to a last operation status, etc. The dating button 31 is a button for designating whether the dating of a selected image is performed.

The enlargement button 32 is an operation device for inputting a command to make an image selected with the selection button 35 or all images in the index display enlarged. The printed sheet count adjusting button 33 is a device for designating the printed sheet count of the image relating to selection, and comprises a sheet count increase button 33A and a sheet count decrease button 33B. Printed sheet count information 38 set for each image is displayed every image in the display section 22. In addition, total printed sheet count information 39 is displayed in the information display area 26 in the lower part of the display screen of the display section 22.

The in-focus confirmation button 34 is a button for inputting a command to make an in-focus location of each image on the image selection screen (index screen or single screen), which is displayed on the display section 22, displayed.

Figure 3:
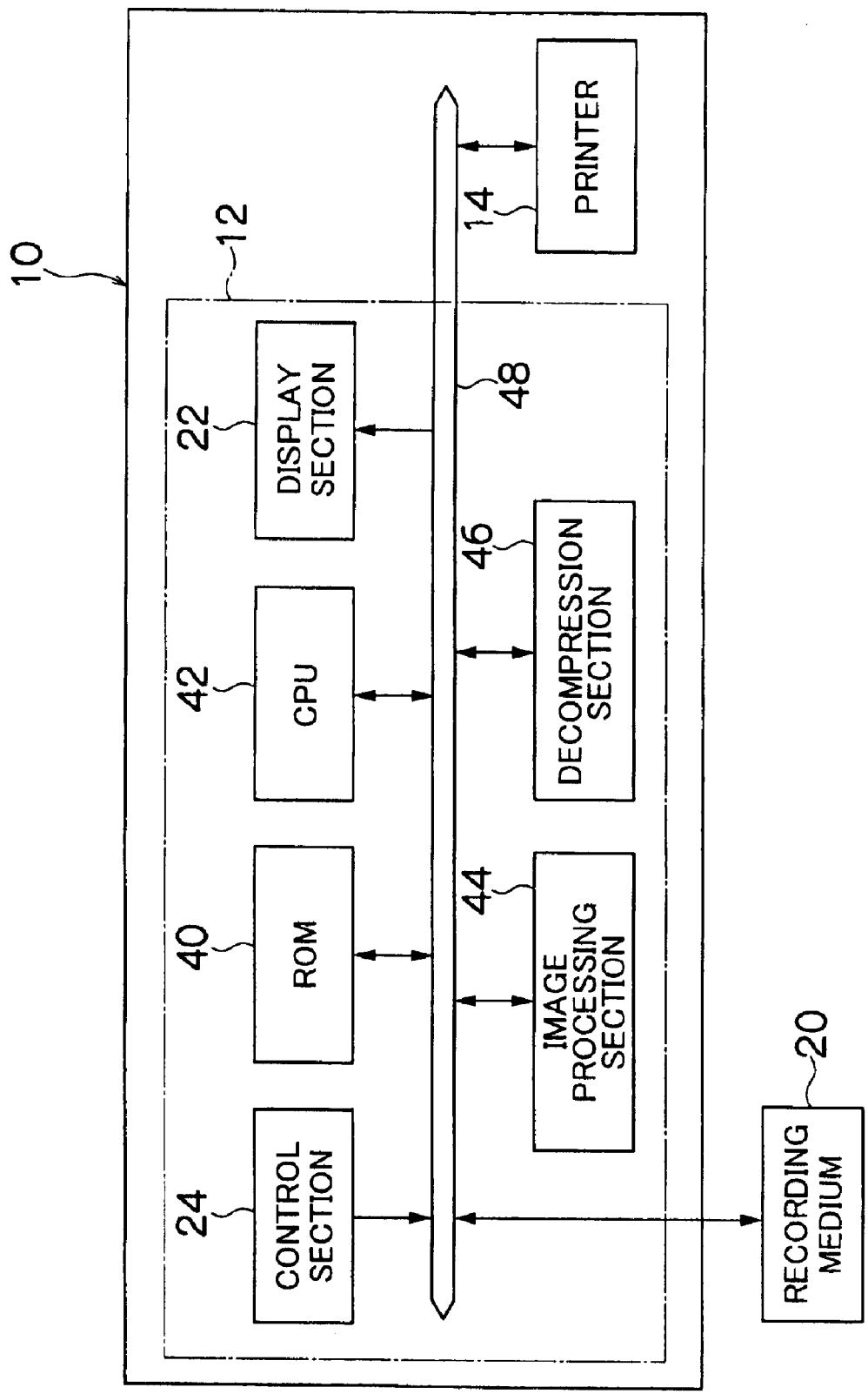
FIG. 3 is a block diagram showing the constitution of the print system.

FIG. 3 is a block diagram showing the constitution of the print system 10 according to the present embodiment. The controller 12 comprises the control section 24, a ROM 40, a CPU 42, an image processing section 44, a decompression section 46, and the display section 22, and these components are connected through a bus 48. The detachable recording medium 20 is connected to the bus 48 by being mounted in the controller 12. In addition, the printer 14 is connected to the bus 48 by being connected to the controller 12 with the connecting cable 16 explained in FIG. 1 (refer to FIG. 3).

The CPU 42 functions as a control device for controlling the print system 10 according to a predetermined program, and also as a calculation device for performing various calculations. Programs executed by the CPU 42 and various data necessary for control are stored in the ROM 40. The CPU 42 controls the circuits in the controller 12 and the operation of the printer 14 on the basis of signals from the control section 24, and controls the reading and writing of the recording medium 20, image signal processing, the display of the display section 22, printing, and the like.

The decompression section 46 is a processing section that decompresses compressed data (for example, JPEG data) read from the recording medium 20.

The image processing section 44 is a signal processing section that processes image signals according to the command of the CPU 42, and functions as a device that generates display signals from image data read from the recording medium 20 and a device that generates print signals. The image processing section 44 has a circuit that performs frequency analysis for inputted images, and calculates a frequency spectrum from inputted image signals. The information of the frequency spectrum detected by the image processing section 44 is sent to the CPU 42, and is utilized for the determination of an in-focus location in the image.

Here, a determining method of an in-focus location will be described.

Figure 4:
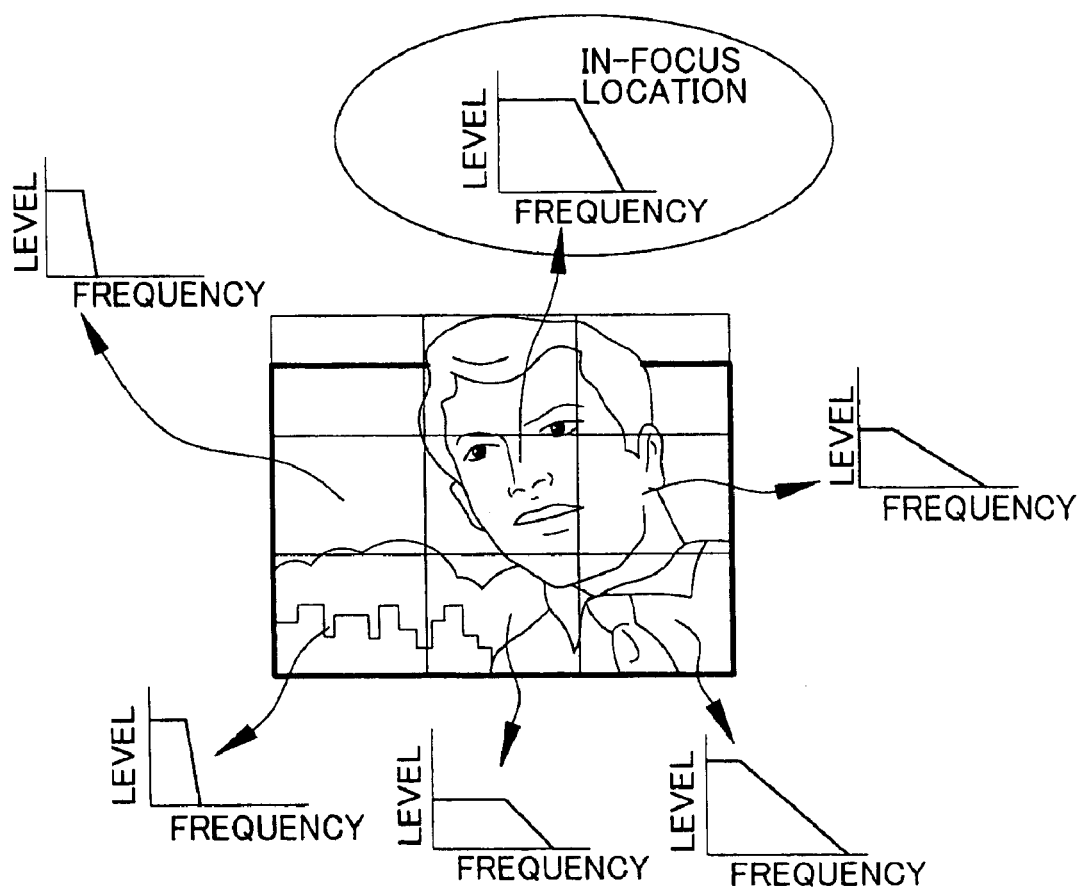
FIG. 4 is an explanatory diagram showing a method for determining an in-focus location.

FIG. 4 shows an example of dividing one image into 3×3 nine-sectional areas and determining a location, which is focused best, from among these areas.

(Procedure 1) First of all, a threshold of a frequency spectrum (this means a shape or a value of the spectrum that becomes a criterion of in-focus determination that the shape or value should have a level equal to or higher than a certain level and cover frequencies equal to or higher than certain frequencies; and hereafter, this is called an "in-focus frequency spectrum threshold", or simply a "threshold") that the image can have when being in an in-focus state is calculated from the resolution (pixel count) and compressibility of an inputted image. Since frequency components of a focused image change by the combination of the resolution and compressibility of the image, it is preferable to determine an in-focus frequency spectrum threshold in every case on the basis of the resolution and compressibility of the inputted image. As for the calculation of the threshold, a table may be utilized, or a calculation formula whose parameters are the resolution and compressibility may be also utilized.

(Procedure 2) After the in-focus frequency spectrum threshold is calculated or at the same time with this calculation processing, the frequency analysis of the image signal is performed for each sectional area of a nine-sectional screen as shown in FIG. 4 to obtain a frequency spectrum of the image data for each sectional area. Frequency spectrum data comprise frequencies and levels, and have the data that which frequency exists in which level. As a location has higher frequency with higher level, it is more probable that the location is an in-focus location.

(Procedure 3) Next, the frequency spectrum obtained from each area is compared with the in-focus frequency spectrum threshold to confirm whether a frequency component whose level is higher than the threshold exists.

(Procedure 4) When a frequency component whose level is higher than the threshold exists, an area having the most frequency components whose levels are higher than the in-focus frequency spectrum threshold in the image is specified, and the area is designated as the in-focus location. That is, when there is a plurality of areas (in-focus locations) whose levels are higher than the threshold, it is essential only to select a location, a level of a high frequency spectrum of which is the highest, as the in-focus location.

(Procedure 5) According to the pressing of the in-focus confirmation button or automatically, the in-focus location is explicitly displayed on the image selection screen (single image or index screen).

(Procedure 6) On the other hand, when there is no area, where a frequency component whose level is higher than the threshold exists, in procedure 3, it is determined that the image is a blurred image without the in-focus location, and the user is informed of out-of-focus with warning display or sound.

The example of calculating the frequency spectrum of each area by dividing one image into nine areas is shown in FIG. 4; however, a division number of images is not limited to that of this example, but it is possible to properly set the division number in relation to required determination accuracy of an in-focus location. When the division number is increased, an in-focus location can be identified in further detail.

Figure 5:
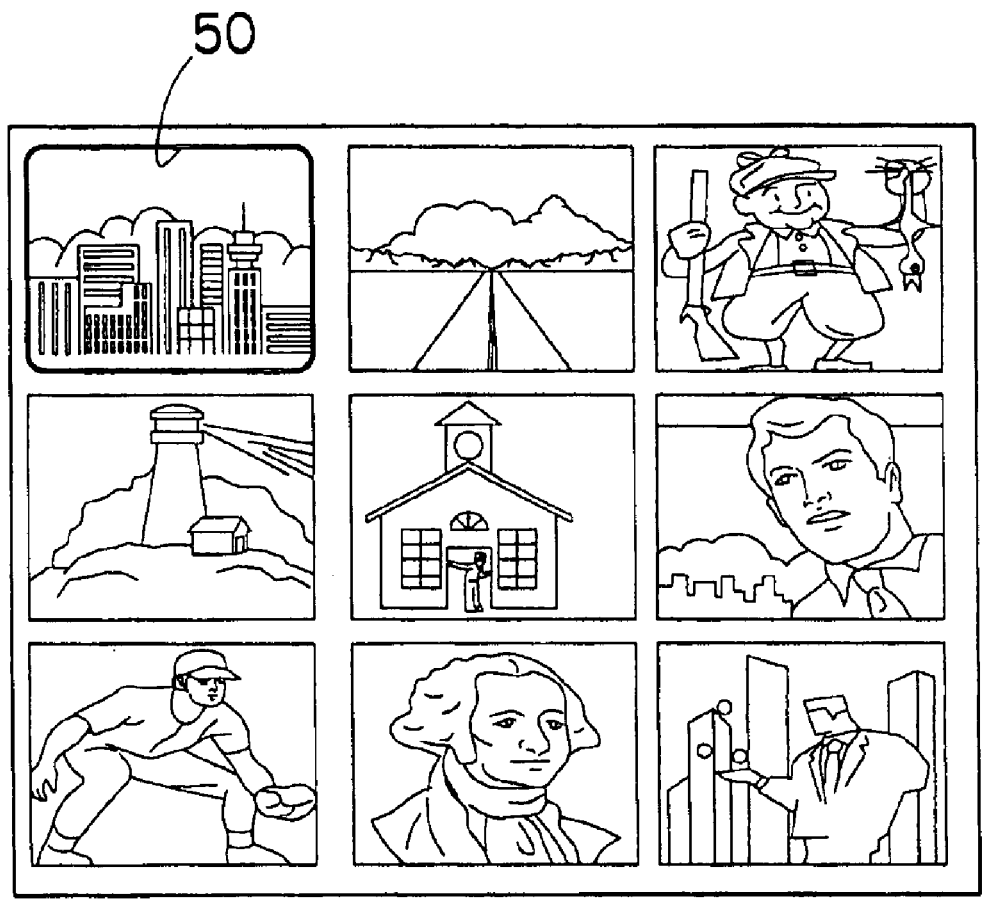
FIG. 5 is a drawing showing a normal index display screen.
Figure 6:
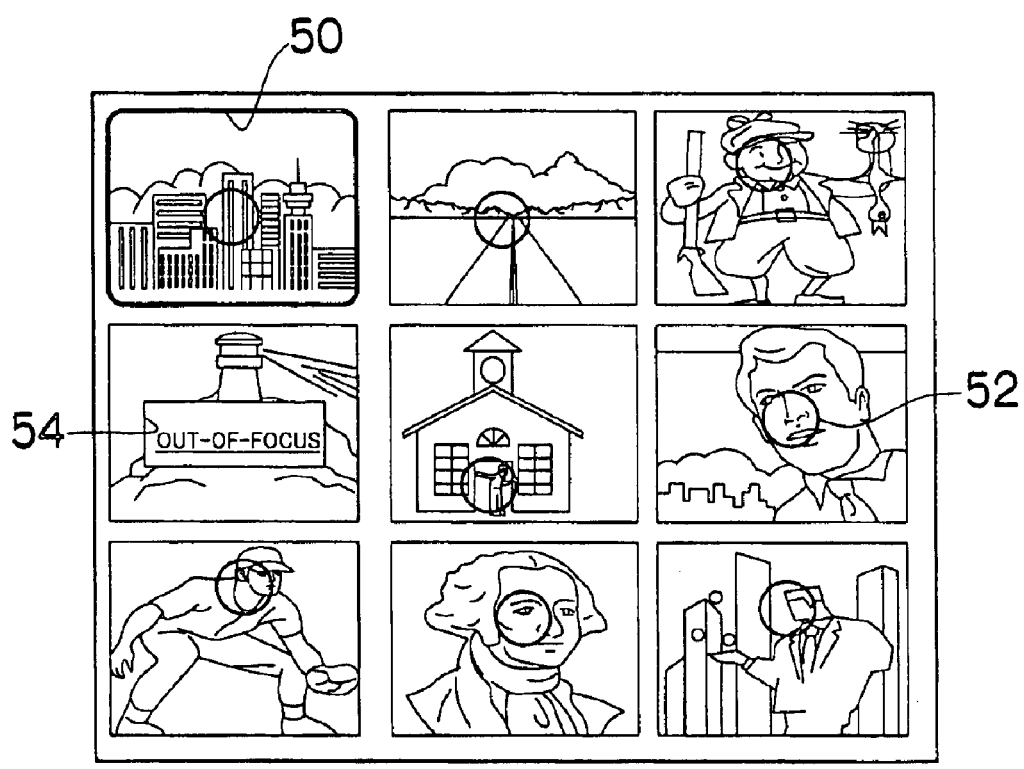
FIG. 6 is a drawing showing an example of making marks, showing in-focus locations, displayed.

FIG. 5 shows an example of a normal index display screen (without display of an in-focus location), and FIG. 6 shows an example of an index display screen when the display of in-focus locations is added. It is possible to switch between the normal index display screen (FIG. 5) and the index display screen where the in-focus locations are shown (FIG. 6), by pressing the in-focus confirmation button 34 of the controller 12. In FIGS. 5 and 6, a cursor frame 50 shows an object to be presently selected.

In FIG. 6, a mark (circle) 52 that shows an in-focus location on the screen for each image is displayed so as to explicitly specify the in-focus location. Warning information 54, "Out-of-Focus" is displayed in an image where an in-focus location can not be determined. A display form of an in-focus location is not limited to the mark 52 in FIG. 6, but it is essential only to perform some information display (special display, highlighted display, etc.) by which the in-focus location can be identified.

Figure 7:
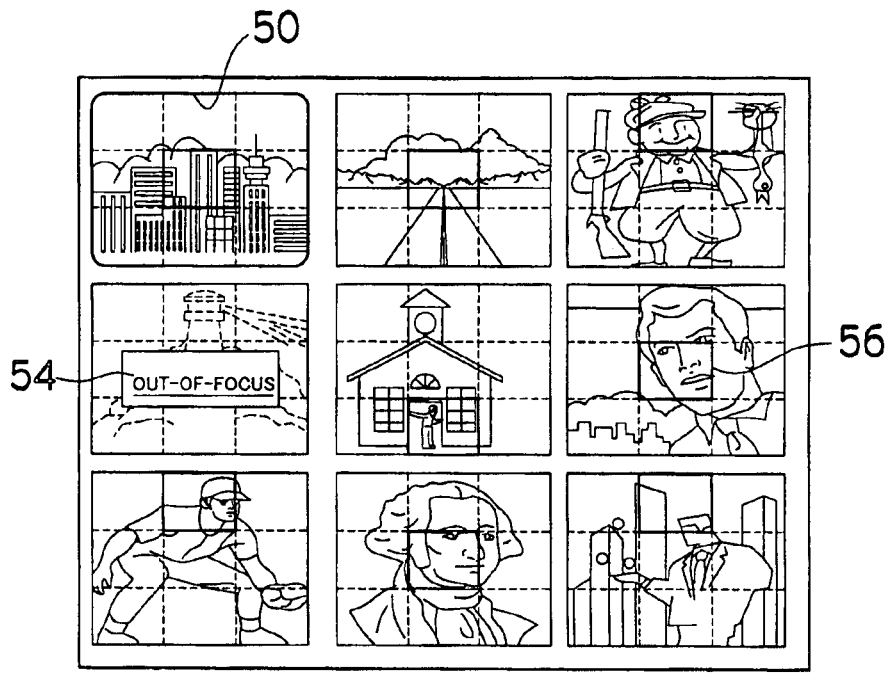
FIG. 7 is a drawing showing another example of making marks, showing in-focus locations, displayed.

FIG. 7 shows another display example of showing in-focus locations in images. It is also a possible aspect to make an area mark 56, which explicitly specifies an area of each in-focus location, as shown in FIG. 7 in place of the display form in FIG. 6. It is also good to create such constitution that a plurality of display forms (for example, the display form in FIG. 6 and the display form in FIG. 7) can be properly switched.

Figure 8:
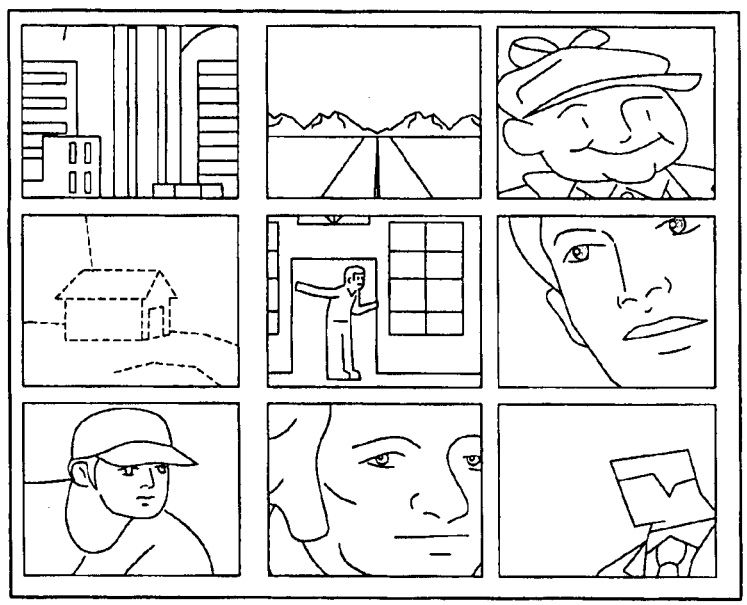
FIG. 8 is a drawing showing an index display screen where an in-focus location is enlargedly displayed.

Furthermore, in the present embodiment, when the enlargement button 32 is pressed in the display state of the in-focus locations shown in FIG. 6 or 7, the in-focus location of each image is enlargedly displayed to the approximately same size as that of a real print as shown in FIG. 8. It is possible to arbitrarily set a zoom factor. By enlargedly displaying each in-focus location in this manner, it is possible to easily confirm whether a desired focused state is obtained.

Next, a print sequence of the print system 10 constituted as described above will be described.

Figure 9:
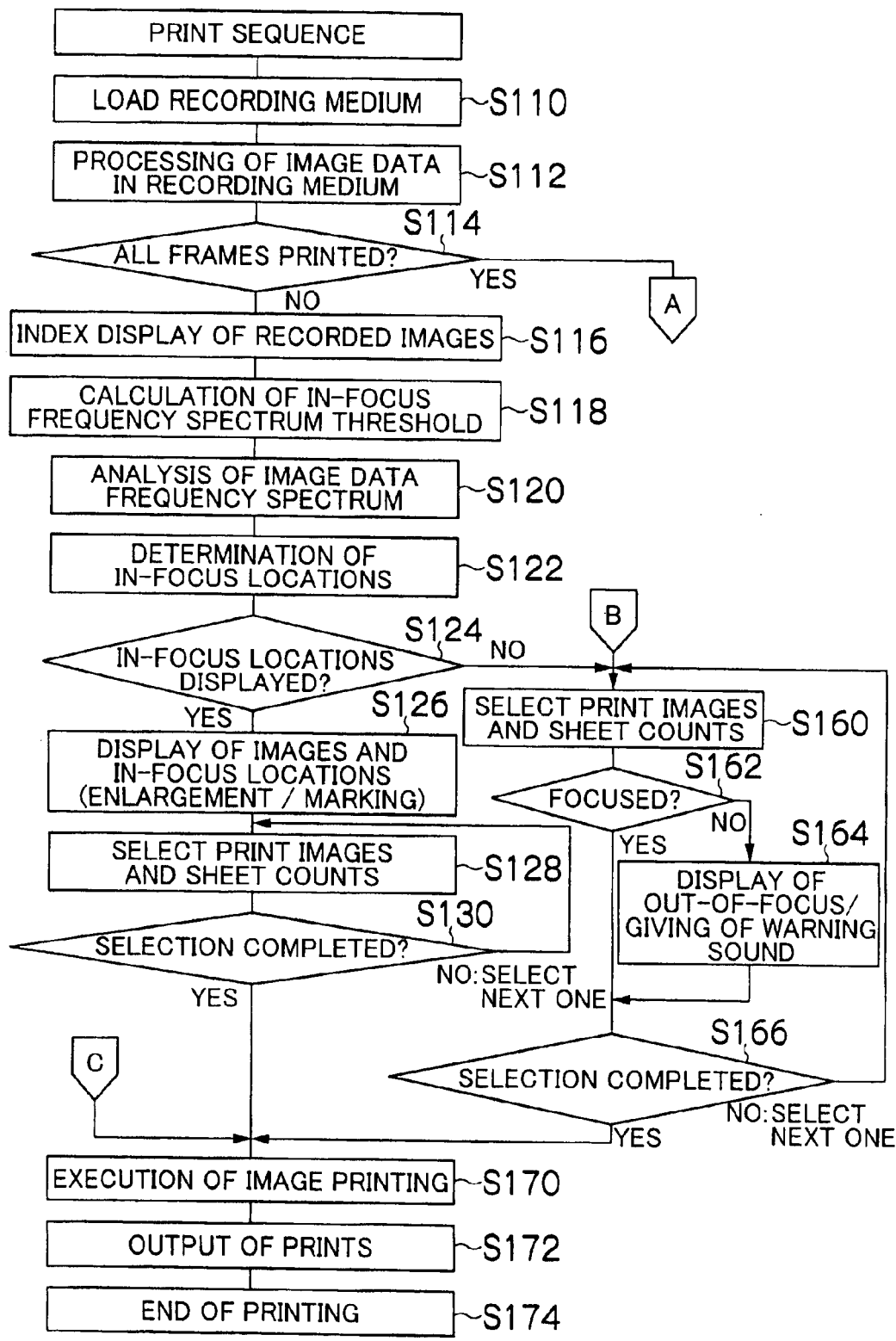
FIG. 9 is a flowchart showing a print sequence.
Figure 10:
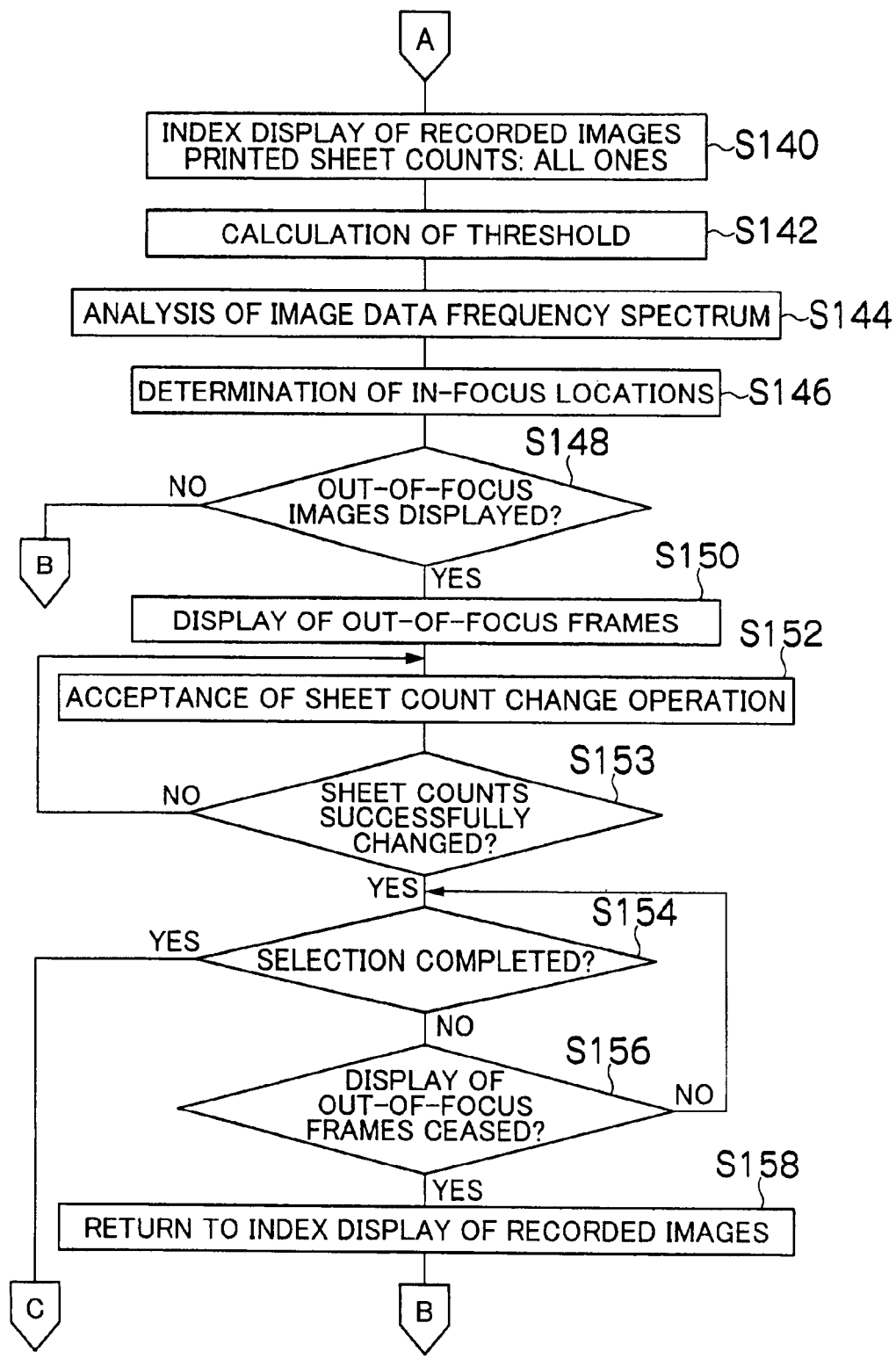
FIG. 10 is a flowchart showing a print sequence.

FIGS. 9 and 10 are flowcharts showing the print sequence of the print system 10 according to the present embodiment. When the recording medium 20 in which image files where compressed image data are stored are recorded is inserted in the media loading slot 18 of the controller 12 (step S110), the image files are read from the recording medium 20 and the images are reproduced (step S112).

When nine-sectional multi-screen display is performed, nine frames of image files are specified from the recording medium 20 automatically in frame number order (recording order). After the compressed data of these image files are decompressed by the decompression section 46, the image files are sent to the image processing section 44. The image processing section 44 generates a signal for index image display for the index display on the basis of the inputted image data. As for the readout order of the image files stored in the recording medium 20, they can be read from the latest one, or can be read from the oldest one. Alternatively, the readout order can be also constituted so that display methods in ascending order and descending order may be able to be switched. It is possible to arrange images with utilizing the image-recording date information attached to the image data, or time-stamps of the files.

Next, the CPU 42 of the controller 12 determines whether the full frame print mode in which all frames of images are printed together is selected (step S114), and switches processing by the determination result.

When the determination is NO at step S114, that is, when the "selection print mode" is selected, the process proceeds to step S116 to perform the index display of the recorded images. The index display here becomes the normal index display screen described in FIG. 5.

After the index display processing (step S116), the CPU 42 performs the processing of calculating an in-focus frequency spectrum threshold for each of images that are presently displayed (step S118), and analyzes the frequency spectrum of the image data of each image (step S120). Then, according to the obtained thresholds and frequency spectrum data, the presence of an in-focus location is checked and the in-focus location is identified (step S122).

That is, as described in FIG. 4, a frequency spectrum of each of a plurality of sectional areas is calculated for a read image, each frequency spectrum of these areas is compared with the threshold, and a location having the most frequency components whose levels are equal to or higher than the threshold is determined as an in-focus location. When steps S116 to S122 in FIG. 9 end for each image presently displayed, the processing of steps S116 to S122 is also performed for other images that are not displayed yet.

The controller 12 accepts user's operation in a state of the index display (refer to FIG. 5). When the user wants to confirm an in-focus location for a displayed image, the user presses the in-focus confirmation button 34. The CPU 42 monitors a signal from the in-focus confirmation button 34, and determines whether the display of the in-focus location (display of the focal position) is performed (step S124).

When the in-focus confirmation button 34 is pressed at step S124 and its command signal is inputted to the CPU 42, the mark 52 or 56 showing the in-focus location of the image is displayed with the image as shown in FIG. 6 or 7 (step S126 in FIG. 9). When the enlargement button 32 is pressed, it is made as shown in FIG. 8 to display the in-focus location to the approximately same size as that of a real print or to enlargedly display the in-focus location in an arbitrarily designated zoom factor. It is thus possible to confirm where the in-focus location is and to confirm an image state of the in-focus location (whether desired focusing is obtained). In regard to an image in which an in-focus location can not be determined (out-of-focus image), it is acceptable to add warning display at the time of enlargement display.

In regard to the display in the display section 22, when the user wants to shift from the index screen to the single screen, the user presses the enlargement button 32 in the display state of the normal index screen (FIG. 5). Then, the image enclosed by the cursor frame 50 on the index screen is enlargedly displayed as the single image on the display section 22. Also when the in-focus confirmation button 34 is pressed in the single screen display, the marking that shows an in-focus location for the single image is performed.

Figure 11:
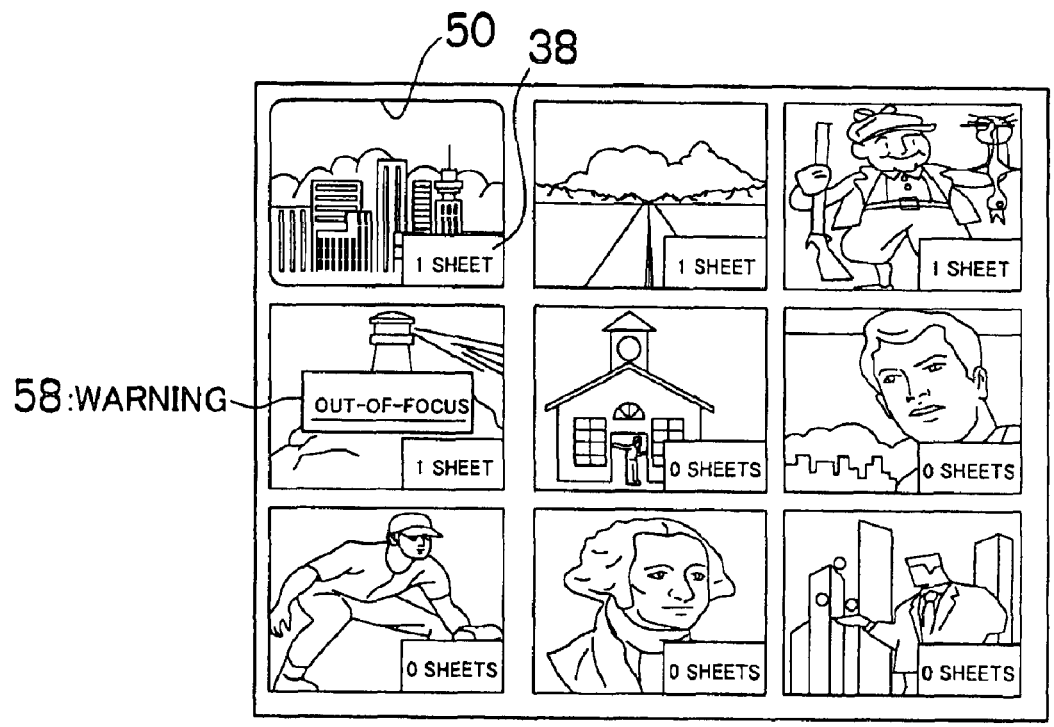
FIG. 11 is a drawing showing an index display screen including sheet count display and warning display.

The user can select a desired image by operating the selection button 35 on the image selection screen in the state of the single screen or index screen. When the user wants to print the selected image, the user designates a printed sheet count by pressing the printed sheet count adjusting button 33 of the controller 12 (step S128 in FIG. 9). The image and printed sheet count information 38 are displayed on the display section 22 at the time of selection operation of the print image and printed sheet count as shown in FIG. 11, so that the user can confirm whether a selection state is good with the display.

The CPU 42 of the controller 12 thus accepts the image selection operation and printed sheet count selection operation by the user, and then determines whether the selection operation is completed (step S130 in FIG. 9). If the selection operation is not completed at step S130, the process returns to step S128 and accepts subsequent image selection.

When the user presses the decision button 36 after performing the necessary selection operation and confirming the selection state, the CPU 42 detects the signal from the decision button 36 and determines at step S130 that the selection is completed.

When the determination at step S130 is YES, the process proceeds to step S170 and the image according to the selection is printed. That is, the image data of the image to be printed are sent from the image processing section 44 to the printer 14, the print processing is performed in the printer 14, and a printed article is produced (step S172). When all the print outputs according to the designation are completed, this sequence ends (step S174).

If the determination at step S124 is NO, that is, the in-focus confirmation button 34 is not pressed and the display of an in-focus location is not performed, the CPU 42 accepts the selection of a print image and a printed sheet count in the display state of the normal index screen (FIG. 5) (step S160 in FIG. 9). The user can select an image that the user wants to print by operating the selection button 35 while seeing the normal index screen, and can designate a printed sheet count by the printed sheet count adjusting button 33.

When the selection operation of print image is performed at step S140, the determination result of the in-focus location (processing result at step S122) is referred to for the image according to the selection so that it is determined whether the in-focus location exists (step S162). If it is determined at step S162 that the in-focus location does not exist, the display of information showing out-of-focus for the selected image (for example, display of the warning information 58, "Out-of-Focus") is performed as shown in FIG. 11 to prompt confirmation to the user (step S164 in FIG. 9). At this time, it is also a possible aspect to generate a warning sound along with the display of the out-of-focus or instead of the display of the out-of-focus.

After step S164 or when the existence of an in-focus location is confirmed at step S162, the process moves to step S166 to determine whether the selection is completed. If the selection is not completed (in the case that the user wants to select a next image or to correctively select another image) at step S166, the process returns to step S160 to accept further selection operation.

When the user presses the decision button 36 after performing the necessary selection operation and confirming the selection state, the CPU 42 detects the signal from the decision button 36 and determines at step S166 that the selection is completed.

If the determination is YES at step S166, the printing of the image according to the selection is executed (step S170), the printed sheets are outputted (step S172), and this sequence ends (step S174).

If the determination in the full frame print mode at step S114 is YES, that is, if the "full frame print mode" is selected, the process moves to step S140 in FIG. 10 to perform the index display of the recorded images. At this time, each printed sheet count of all the frames is automatically set at "one sheet".

Thereafter, the CPU 42 calculates an in-focus frequency spectrum threshold for each image presently displayed (step S142), and analyzes frequency spectra of image data of the images (step S144) to determine the presence of an in-focus location and identify the in-focus location (step S146) from the obtained threshold and frequency spectrum data. The processing at steps S142 to S146 is similar to the processing at steps S118 to S122 in FIG. 9.

In the state of the index display at step S140 in FIG. 10, the controller 12 accepts the user's operation of whether to extract and display an out-of-focus image. When the user wants to confirm only the image determined that it is out-of-focus among the recorded images, the user operates a specific button of the control section 24 in the controller 12. For example, the in-focus confirmation button 34 also serves as the operating button for commanding the display of the out-of-focus image, or there is also an aspect that the operating button for commanding the display of the out-of-focus image is separately provided.

The CPU 42 monitors a signal from the control section 24, and determines whether to extract and display the out-of-focus image (step S148). If the determination is NO at step S148, the process moves to step S160 in FIG. 9. The subsequent processing is as already described above.

If the determination is YES at step S148, the process proceeds to step S150 in FIG. 10. At step S150, the CPU 42 extracts a frame determined that no in-focus location exists (out-of-focus frame) on the basis of the determination result of the in-focus location (processing result at step S146), and performs processing of making the display section 22 display the out-of-focus frame (step S150). Thus, only the image determined that it is an out-of-focus image (blurred image) (out-of-focus frame) is displayed. Thereafter, the printed sheet count change operation becomes possible for the out-of-focus frame (step S152).

The user can determine the necessity of printing with confirming the image, and performs the operation of setting the printed sheet count at "0 sheet" by operating the sheet count decrease button 33B for the image determined that no print is necessary. Thus, a useless print can be prevented. It is preferable that there is provided an operation of collectively setting the printed sheet count at "0 sheet" for all the out-of-focus frames automatically extracted.

If an image that is desired to be printed exists among the out-of-focus frames automatically extracted, it is essential only to set the printed sheet count at a value of one or more.

After accepting the printed sheet count change operation from the user at step S152, the CPU 42 determines whether the printed sheet count change operation is completed (step S153). If the determination is NO at step S153 (operation is continued), the process returns to step S152. On the other hand, when it is determined that the printed sheet count change operation is completed at step S153, the process proceeds to step S154.

At step S154, it is determined whether the selection of the image to be printed and its sheet count is completed. If the user corrects the printed sheet count for the unnecessary frames by confirming the out-of-focus frames and allows single-sheet printing for other frames, the user presses the decision button 36 to complete the selection. When the selection is completed at step S154, the process moves to step S170 in FIG. 9 to execute the printing of the image according to the selection.

On the other hand, if the selection is not completed at step S154 in FIG. 10, the process proceeds to step S156, and it is determined whether a command is inputted to cease the display state of the out-of-focus frame and return the display state to the normal index screen.

If the determination is NO at step S156, the process returns to step S154, and the display screen of the out-of-focus frame is kept. On the other hand, if the determination is YES at step S156, the screen is switched to the normal index display (step S158). After step S158, the process moves to step S160 in FIG. 9, and it becomes possible to select an image and designate a printed sheet count as previously mentioned.

In the print system 10 according to the above-described embodiment, since an image is printed after its in-focus location is confirmed for image data read from the recording medium 20, it is possible to print only in-focus images, and hence, it is possible to avoid useless printing.

The print system 10 according to the above-described embodiment informs the user of the presence of an in-focus location and the information of the in-focus location at the time of the selection of an image to be printed. Hence, it is possible to shorten the time needed to select images to be printed.

The print system 10 according to the above-described embodiment checks the presence of the in-focus location and specifies the in-focus location by performing the frequency analysis of image data itself recorded in the recording medium 20. Hence, it is not necessary to record the data etc. that show the in-focus location at the time of image-recording.

Although the marking display of an in-focus location is performed in response to the pressing of the in-focus confirmation button 34 in the above-described embodiment, it is acceptable to create such constitution that automatically displays the in-focus location without pressing the in-focus confirmation button 34 so as to make user's operation simple.

For example, it is also acceptable to perform such control that makes an in-focus location automatically displayed when a screen shifts to the print selection screen to select a print image and a printed sheet count.

If no marking display showing an in-focus location is performed as shown in FIG. 11, there is an aspect that, at the time of the print selection (image selection or designation of one or more of sheet count) of a blurred image (image where a certain high frequency component is not included), the user is cautioned by the display of the warning information 58, warning voice, or the like meaning that the image is out-of-focus, so as to prompt the user to confirm continuation of print processing.

Although the controller 12 and the printer 14 are connected to each other through the connecting cable 16 in the print system 10 according to the above-described embodiment, the scope of the present invention is not limited to this. It is also a possible aspect to perform data transfer by using wireless communication devices in place of the connecting cable 16. It is also possible to apply the present invention to a print apparatus (for example, a self-operation type print machine) where functions of the controller 12 and functions of the printer 14 are installed integrally.

Since the present invention has such constitution that automatically distinguishes an in-focus location in an image by analyzing inputted image data itself and explicitly specifies the in-focus location to the user through a screen of a display device, it is possible to shorten the time needed to select images to be printed, and to suppress a useless print by avoiding an unnecessary image that is blurred.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image display apparatus, comprising:
   a signal processing device which generates a display signal from inputted image data;
   a display device which displays an image according to the display signal generated by the signal processing device;
   an in-focus location determination device which performs analysis of the inputted image data and identifies an in-focus location in the image represented by the inputted image data according to a result of the analysis; and
   a display control device which makes the display device display information specifying the in-focus location identified by the in-focus location determination device,
   wherein the in-focus location determination device compares a frequency spectrum of the inputted image data with a threshold for in-focus determination, and determines an area that has most frequency components whose levels are higher than the threshold, as the in-focus location.

2. The image display apparatus as defined in claim 1, wherein the in-focus location determination device comprises:

an analysis device which divides one screen of the image represented by the inputted image data into a plurality of areas, and calculates the frequency spectrum of the inputted image data for each of the plurality of areas; and a threshold calculation device which calculates the threshold for in-focus determination according to recording condition including at least one of resolution and compressibility of the inputted image data.

3. The image display apparatus as defined in claim 1, further comprising a warning device which gives a warning when the in-focus location determination device determines that there is no in-focus location in the image.

4. The image display apparatus as defined in claim 1, further comprising an enlarged-display control device which makes the display device enlargedly display an image in the in-focus location identified by the in-focus location determination device.

5. A print system, comprising:

a data obtaining device which obtains image data;

a signal processing device which generates a display signal from the image data obtained by the data obtaining device;

a display device which displays an image according to the display signal generated by the signal processing device;

an in-focus location determination device which performs analysis of the image data and identifies an in-focus location in the image represented by the image data according to a result of the analysis;

a display control device which makes the display device display information specifying the in-focus location identified by the in-focus location determination device;

a selection operation device with which operation is performed to select an image to be printed from among image displayed on the display device; and a print device which prints the image selected with the selection operation device, wherein the in-focus location determination device compares a frequency spectrum of the inputted image data with a threshold for in-focus determination, and determines an area that has most frequency components whose levels are higher than the threshold, as the in-focus location.

6. The print system as defined in claim 5, wherein the in-focus location determination device comprises:

an analysis device which divides one screen of the image represented by the image data into a plurality of areas, and calculates the frequency spectrum of the image data for each of the plurality of areas; and a threshold calculation device which calculates the threshold for in-focus determination according to recording condition including at least one of resolution and compressibility of the image data.

7. The print system as defined in claim 5, further comprising a warning device which gives a warning when the in-focus location determination device determines that there is no in-focus location in the image.

8. The print system as defined in claim 5, further comprising an enlarged-display control device which makes the display device enlargedly display an image in the in-focus location identified by the in-focus location determination device.

9. A program which makes a computer achieve:

a signal processing function of generating a display signal from inputted image data;

an image display function of making a display device display an image according to the display signal generated by the signal processing device;

an in-focus location determination function of performing analysis of the inputted image data, and identifying an in-focus location in the image represented by the inputted image data according to a result of the analysis; and an in-focus location display function of making the display device display information specifying the in-focus location identified by the in-focus location determination function, wherein the in-focus location determination function compares a frequency spectrum of the inputted image data with a threshold for in-focus determination, and determines an area that has most frequency components whose levels are higher than the threshold, as the in-focus location.

10. The program as defined in claim 9, wherein the in-focus location determination function comprises:

an analysis function of dividing one screen of the image represented by the inputted image data into a plurality of areas, and calculating the frequency spectrum of the inputted image data for each of the plurality of areas; and a threshold calculation function of calculating the threshold for in-focus determination according to recording condition including at least one of resolution and compressibility of the inputted image data.

11. The program as defined in claim 9, which makes the computer further achieve a warning function of giving a warning when the in-focus location determination function determines that there is no in-focus location in the image.

12. The program as defined in claim 9, which makes the computer further achieve an enlarged-display control function of making the display device enlargedly display an image in the in-focus location identified by the in-focus location determination function.

13. The image display apparatus as defined in claim 1, wherein the inputted image data is input from a memory card recoding medium.

14. The image display apparatus as defined in claim 1, wherein selection of images for printing is made according to the displayed information.

15. The print system as defined in claim 5, wherein the inputted image data is input from a memory card recoding medium.

16. The print system as defined in claim 5, wherein selection of images for printing is made according to the displayed information.

17. The program as defined in claim 9, wherein the inputted image data is input from a memory card recoding medium.

18. The program as defined in claim 9, wherein selection of images for printing is made according to the displayed information.

* * * * *